United States Patent [19]

Kampf et al.

[11] Patent Number: 4,904,523

[45] Date of Patent: Feb. 27, 1990

[54] POLYESTER HEAT BONDED PRODUCT

[75] Inventors: Quentin L. Kampf; Chester J. Petkiewicz, both of Lowell; Gernot K. Buerger, Groveland, all of Mass.

[73] Assignee: Pellon Company, Lowell, Mass.

[21] Appl. No.: 282,952

[22] Filed: Dec. 5, 1988

Related U.S. Application Data

[63] Continuation of Ser. No. 855, Jan. 6, 1987, abandoned.

[51] Int. Cl.$^4$ ................................................ C09J 5/02
[52] U.S. Cl. ..................................... 428/288; 156/60; 156/285; 428/294
[58] Field of Search ...................... 428/288, 294, 95; 156/60, 285

[56] References Cited

U.S. PATENT DOCUMENTS

| | | |
|---|---|---|
| 3,770,562 | 11/1973 | Newman ............................ 156/290 |
| 3,837,995 | 9/1974 | Floden ............................... 428/296 |
| 4,039,711 | 8/1977 | Newman ............................ 428/286 |
| 4,180,611 | 12/1979 | Schultheiss et al. ................ 428/288 |
| 4,363,682 | 12/1982 | Thiebault ........................... 156/181 |
| 4,377,615 | 3/1983 | Suzuki et al. ...................... 428/213 |
| 4,424,250 | 1/1984 | Adams et al. ...................... 428/95 |
| 4,472,229 | 9/1984 | Martin ............................... 428/286 |

Primary Examiner—Marion C. McCamish
Attorney, Agent, or Firm—Felfe & Lynch

[57] ABSTRACT

Disclosed is a nonwoven fabric which is a nonspunbonded fabric and has a surface free of standing fibers and a method for making the same. The fabric is useful as a support for case on coatings to form a composite for TFC membrane filters. The fabric is formed of a first layer having binder fiber and matrix fiber. A second layer of 100 percent binder fiber is cast thereon. The binder fiber has a softening point lower than the melting point of the matrix fiber. The first and second layers are bonded by heat and pressure to form the fabric.

28 Claims, No Drawings

POLYESTER HEAT BONDED PRODUCT

This application is a continuation of application Ser. No. 000,855, filed Jan. 6, 1987, now abandoned.

BACKGROUND OF THE INVENTION

The invention relates to the manufacture of fabrics which possess a surface free of standing fibers or fiber loops. Such fabrics can be used as a support upon which a film or film-like material can be cast. The resulting composite will have neither fiber ends nor fiber loops protruding into or through the coating. The present invention is particularly well suited for use in the production of membrane filters, especially those for thin film composite (TFC) membrane filters.

In liquid filtration applications, such as reverse osmosis (RO) and ultrafiltration (UF), a membrane is often cast upon a support fabric. The fabric has many requirements including but not limited to strength, smoothness, and complete fiber tie-down of all surface fibers. In TFC technology, complete fiber tie-down is important for the supports upon which the thin film will be cast.

The coatings employed in TFC technology are of low viscosity, i.d., 300 to 400 cps and low add-ons (3 mils), compared to conventional methods (2000 cps and between 3 and 5 mils). Accordingly, membranes of very small thickness, i.e., less than three mils in many cases are produced. Because of the low viscosity coating and the fiber's rigid structure relative to the coating, any standing fibers will protrude through the coating creating a discontinuous membrane and a channel through which unfiltered liquid can bypass the membrane filter. Thus the filtered liquid may be contaminated.

Efforts to obtain suitable surface finishes with only a few standing fibers or fiber loops have involved using a hot calendering process with thermoplastic fibers, or a fabric made of spunbonded material (continuous fibers), or a combination of both. However, all these procedures produce fabrics which still possess standing fibers or fiber loops or involve relatively complicated manipulations rendering them less than completely satisfactory.

U.S. Pat. No. 3,837,995 discloses autogenously bonded multi-ply nonwoven constructions wherein one layer is composed of synthetic thermoplastic microfibers and another layer is composed of natural fibers. The layers of synthetic microfibers and natural fibers are bonded by contact only without need for supplemental bonding such as an adhesive or otherwise. Microfibers having a diameter of less than 10 microns and natural fibers such as wool, wood fibers, cotton, flax, jute and silk as well as those manufactured from natural polymer sources including rayon are utilized. The thermoplastic fibers used include polyolefins, polyesters, polyamides and polyacrylates.

U.S. Pat. Nos. 3,770,562 and 4,039,711 each relate to nonwoven fabrics wherein staple thermoplastic fibers are bonded to each face of a spun-bonded web of entangled and interlaced continuous filaments.

U.S. Pat. No. 4,180,611 discloses a nonwoven fabric adapted for use as a support material for a semipermeable membrane. The fabric is formed of a support mat into at least one surface of which an open-structured continuous covering layer of fine thermoplastic particles is calendered. The nonwoven fabric consists of a nonwoven hydrodynamically formed underlayer using thermoplastic staple fibers and has been preconsolidated by a drying process. Then a layer of fine thermoplastic particles is applied to the surface of the underlayer by electrostatic spraying of plastics from solvents. Layer weights of about 10 to 40 g/m$^2$ are obtained.

U.S. Pat. No. 4,363,682 to Thiebault discloses a finishing process for smoothing the face of a nonwoven and highly aerated filtering layer and forming an electret by means of a metal mass at which the temperature is between 115° and 150° C. which passes over the surface to be smoothed.

Suzuki et al in U.S. Pat. No. 4,377,615 disclose nonwoven fabrics having an upper layer with a substantially smooth surface and a lower layer having a density lower than that of the upper layer. The lower layer contains a smaller amount of adhesive bonding products, i.e., 0.5 to 5 wt.-%, than in the upper layer, 15 to 40 Wt.-%. Each layer contains a distribution of hydrophobic and hydrophilic fibers. Polyester, polypropylene, acrylic, rayon, acetate and the like are used as the fiber in the upper and/or lower layer. Acrylic ester copolymer is used as adhesive. The composite can be used for preventing back flow of body exudates.

THE INVENTION

The present invention is in a nonwoven fabric which is not a spunbonded fabric and is free of standing surface fibers and a method for production of such a fabric. The fabric is particularly well suited for use as a support fabric for the casting of coatings, membranes, and films. Prior fabrics suitable for this application are usually woven and spunbonded fabrics of continuous filament fibers.

The fabric of the invention is a layered fabric. The layered fabric has a lower or first fibrous layer consisting of a mixture of matrix fibers and thermoplastic binder fibers. The upper or second layer is composed of 100% binder fiber which, when bonded, provides a surface free of standing fibers. A binder fiber is a thermoplastic fiber which possesses the ability to adhere to other fibers at a temperature which is significantly lower than the melting point of the matrix fiber.

Thermoplastic matrix fibers cannot be used as the binder fiber because once the activation point (bonding point) of the fibers is reached, uncontrollable shrinkage would occur. When thermoplastic matrix fibers are used along with the binder fibers, a temperature differential between the respective softening or melting points of approximately 25° C. or more is sufficient to insure that the matrix fiber will not be adversely affected.

The layered fleece is bonded by sufficient heat and pressure to activate the binder fibers and to create contact between binder fibers and the matrix fibers of the lower layer. The resulting fabric will be free from any standing fibers and with respect to spunbonded fabrics, it will be uniformly free of thick and thin sections. Such thickness variations generally result in problems in filtration.

In the process of the invention, one can use ordinary, relatively less expensive dry-lay nonwoven technology and commercially available non-exotic fibers to produce a fabric with a surface possessing no standing fibers. The invention utilizes both a layer fabric and a pressing step while the binder fibers are at their bonding temperature.

Keeping in mind the abilities of a normal card machine and the requirements for the best possible support fabric, the range of fiber sizes in fineness, is from 1.25 d to 5 denier. The fiber length is from 1.5 in. to 2.5–3 in.

If one goes to a finer denier fiber the card machine will have difficulties in producing a uniform fleece. If one uses a coarser fiber the resulting fabric can be too porous thus allowing the coating to completely penetrate the fabric. If one uses fibers which are shorter than 1.5 in. again the fleece uniformity will suffer. Using fibers longer than the maximum length will cause problems in the carding operations because standard cards are not designed to card very long fibers.

The binder fiber content of the first layer should be sufficient to provide a fabric with usable strength. The strength of the fabric also depends on the amount of matrix fiber present. Given a specific weight per unit area, the more matrix fiber present, the weaker the fabric will be. The end application will determine the amount of matrix fiber required. The amount of binder fiber in the first layer should generally be at least 25% of the bonded product because less binder fiber is likely to weaken the structure to a point where it will not hold up in continued use. An amount of 35% or more of the binder fiber is preferred and most preferred is an amount of at least 50% to give outstanding structural properties. Little advantage is gained by including binder fiber in an amount of over 70% and it tends to increase cost of the product because the binder fiber is more costly than the matrix fiber. Accordingly, amounts over 70% give little useable improvement in the desired characteristics and will make the product less economical.

Suitable matrix fibers for use in the invention are those of polyester especially poly(ethylene terephthalate), polyamide, and polypropylene. Acrylics and natural fibers such as cotton and wool and regenerated cellulostic fibers can also be used. The binder fibers can be of a configuration such as bicomponents of either the core/sheath or side-by-side classes, undrawns or copolymers. Suitable bicomponent binder fibers are poly(ethylene terephthalate)/poly(ethylene isophthalate), poly(ethylene terephthalate)/polypropylene; poly(ethylene terephthalate)/polyethylene; and polypropylene/polyethylene. Other suitable binder fibers are copolyesters and undrawn polyesters. Preferred combinations of matrix fibers and binder fibers are poly(ethylene terephthalate) with poly(ethylene terephthalate)/poly(ethylene isophthalate); poly(ethylene terephthalate) with poly(ethylene terephthalate)/polypropylene or polyethylene terephthalate/polyethylene; poly(ethylene terephthalate) with propylene/polyethylene as well as polypropylene/polyethylene.

The weights per unit area of the two layers can differ. The binder fiber layer must possess enough fibers to completely cover the first layer. Specific weights of 10 g/m² and no less than 5 g/m² using a drylayed fiber mat have been found to be completely satisfactory. However, the weight of the first layer depends on the specific end application. For instance, if a fabric is needed for membrane casting, it must withstand the pressures used during the filtering process. For this reason, membrane producers require fabrics having weights in the range of 30 to 250 g/m².

In the fabrics of the invention the weight per unit area is generally in the range of 30 to 250 grams per square meter but a range of 50 to 200 grams per square meter is preferred. Lower weight fabrics tend to be of insufficient weight for support fabrics. Weights per unit area of over 200 grams per square meter are generally unnecessary for the presently contemplated applications.

Generally speaking, regardless of the total fabric weight, only 10 g/m² of the binder fiber is needed to make a layer which can completely cover the lower layer. If one has a poor fiber carding system which produces a non-uniform fleece, then he may have to produce a 15 to 20 g/m² fleece to obtain total coverage.

The layers described above must then be bonded together by heat. The heat can be supplied by one of the following methods: a calender, an oven (either the suction or convention type), or any combination thereof. However, to achieve a fabric free of standing surface fibers, the layer material must be pressed while hot. Linear pressures of 10 to 500–600 kp per centimeter are generally suitable.

The combination of utilizing a layer of 100% binder fiber and a hot pressing step will produce a fabric without standing surface fibers because at the activation temperature, the binder fiber will adhere to other binder fibers and to the matrix fibers with which it comes in contact. For this reason, a fiber layer containing only binder fibers will have every fiber adhering to an adjacent fiber thus locking the adjacent fiber to the surface.

A matrix fiber cannot be used in place of the binder fiber because when it is brought to its activation point, the fiber begins to melt and shrink uncontrollably. Depending on which fiber is used, the matrix fiber may even form droplets and then be completely transformed from the fibrous state. Such distortions would not be tolerable in applications which require a surface free of standing fibers.

The coating thickness is approximately 2–3 mils (70 um). Approximately one half of the coating will penetrate into the nonwoven support, thus further reducing the thickness. Therefore, standing fiber ends or loops must be less than 0.001 in. to be non-interfering for all cases.

EXAMPLES

Example 1

A carded drylayed fibrous mat was bonded using a suction oven at a temperature of 225° C. The material was then post-calendered using a pressure of 300 kp/cm and a calender temperature of 200° C. The production speed was 20 m/min. The resulting fabric was free of standing surface fibers and standing fiber loops. The mat contained a layer of forty (40) g/m² of poly(ethylene terephthalate) matrix fiber and forty (40) g/m² of poly(ethylene terephthalate)/poly(ethylene isophthalate) bicomponent binder fiber and a layer of ten (10) g/m² poly(ethylene terephthalate)/poly(ethylene isophthalate) bicomponent binder fiber. The bicomponent fiber was of the core/sheath type. This resulting fabric was suitable for use as a support for membranes casted according to TFC technology.

Example 2

Example 1 was repeated but the calender step was eliminated and a pressing step immediately after the suction bonding oven was used to impart a surface free of standing fibers. The pressure of the rolls was 10 kp per centimeter and roll temperature was 110° C.

It will be understood that the specification and examples are illustrative but not limitative of the present invention and that other embodiments within the spirit and scope of the invention will suggest themselves to those skilled in the art.

We claim:

1. A nonwoven fabric which is not spunbonded comprising: a first layer of a thermoplastic binder fiber and a matrix fiber, the matrix fiber being at least one of a second thermoplastic, cotton, wool and regenerated cellulostic fibers and a second layer, the second layer consisting essentially of thermoplastic binder fiber, said binder fiber having a softening point lower than a melting point of said matrix fiber; said first and second layers being bonded by heat and pressure to form said fabric, said fabric being free of standing surface fibers.

2. The fabric of claim 1, wherein said first layer contains at least 25 wt.-% binder fiber.

3. The fabric of claim 1 wherein the first and second thermoplastic are different polyesters.

4. The fabric of claim 1, wherein the binder fiber is selected from the group consisting of poly(ethylene terephthalate)/poly(ethylene isophthalate), poly(ethylene terephthalate)/polypropylene, poly(ethylene terephthalate)/polyethylene, polypropylene/polyethylene, copolyesters, and undrawn polyester.

5. The fabric of claim 1, wherein the matrix fiber is selected from the group consisting of polyester especially poly(ethylene terephthalate), a polyamide, and polypropylene.

6. The fabric of claim 1 having a weight per unit area in the range of 30 to 250 g/m$^2$.

7. The fabric of claim 1 containing at least 35 wt. % binder fiber.

8. The fabric of claim 1 wherein each of the binder fibers and matrix fibers have a fiber length of from about 1.5 to 3 inches.

9. The fabric of claim 1 having a weight per unit area in the range of 50 to 200 g/m$^2$.

10. The fabric of claim 1 containing at least 50 wt. % binder fiber.

11. A composite comprising a support fabric, said fabric being a nonwoven fabric which is not spunbonded comprising: a first layer of a thermoplastic binder fiber and a matrix fiber, the matrix fiber being at least one of a second thermoplastic, cotton, wool and regenerated cellulostic fibers, and a second layer, the second layer consisting essentially of thermoplastic binder fiber, said binder fiber having a softening point lower than a melting point of said matrix fiber; said first and second layers being bonded by heat and pressure to form said fabric, said fabric being free of standing surface fibers; and a coating cast on said support fabric.

12. The composite of claim 11, wherein said first layer contains at least 25 wt.-% binder fiber.

13. The composite of claim 11, wherein the first and second thermoplastics are different polyesters.

14. The composite of claim 11, wherein the binder fiber is selected from the group consisting of poly(ethylene terephthalate)/poly(ethylene isophthalate), poly(ethylene terephthalate)/polypropylene, poly(ethylene terephthalate)/polyethylene, polypropylene/polyethylene, copolyesters, and undrawn polyester.

15. The composite of claim 11, wherein the matrix fiber is selected from the group consisting of polyester especially poly(ethylene terephthalate), a polyamide, and polypropylene.

16. The composite of claim 11, wherein the fabric has a weight per unit area in the range of 30 to 250 g/m$^2$.

17. The composite of claim 11, wherein the first layer contains at least 35 wt. % binder fiber.

18. The composite of claim 11 wherein the fabric has a weight per unit area in the range of 50 to 200 g/m$^2$.

19. The composite of claim 11 wherein the first layer contains at least 50 wt. % binder fiber.

20. A method of forming a nonwoven fabric which is not spunbonded comprising:
providing a first layer of thermoplastic binder fiber and matrix fiber, the matrix fiber being at least one of a second thermoplastic, cotton, wool and regenerated cellulostic fibers; providing on said first layer a second layer consisting essentially of thermoplastic binder fiber, said binder fiber having a softening point lower than a melting point of said matrix fiber; and bonding said first and second layers by heat and pressure to form said fabric, said fabric being free of standing surface fibers.

21. The method of claim 20, wherein said first layer contains at least 25 wt.-% binder fiber.

22. The method of claim,20 wherein the first and second thermoplastics are different polyesters.

23. The method of claim, 20 wherein the binder fiber is selected from the group consisting of poly(ethylene terephthalate)/poly(ethylene isophthalate), poly(ethylene terephthalate)/polypropylene, poly(ethylene terephthalate)/polyethylene, polypropylene/polyethylene, copolyesters, and undrawn polyester.

24. The method of claim 20, wherein the matrix fiber is selected from the group consisting of polyester especially poly(ethylene terephthalate), a polyamide, and polypropylene.

25. The method of claim 20, wherein the nonwoven fabric has a weight per unit area in the range of 30 to 250 g/m$^2$.

26. The method of claim 20, wherein the first layer contains at least 35 wt.-% binder fiber.

27. The method of claim 20 wherein the nonwoven fabric has a weight per unit area in the range of 50 to 200 g/m$^2$.

28. The method of claim 20 wherein the first layer contains at least 50 wt. % of binder fiber.

* * * * *